(12) United States Patent
Reial et al.

(10) Patent No.: US 11,089,584 B2
(45) Date of Patent: Aug. 10, 2021

(54) QUASI-COLOCATION OF SYSTEM ACCESS AND CONTROL SIGNALS

(71) Applicant: Telefonaktiebolaget LM Ericsson (publ), Stockholm (SE)

(72) Inventors: Andres Reial, Malmö (SE); Pål Frenger, Linköping (SE); Henrik Sahlin, Mölnlycke (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 22 days.

(21) Appl. No.: 16/496,696

(22) PCT Filed: Mar. 23, 2018

(86) PCT No.: PCT/IB2018/051980
§ 371 (c)(1),
(2) Date: Sep. 23, 2019

(87) PCT Pub. No.: WO2018/172987
PCT Pub. Date: Sep. 27, 2018

(65) Prior Publication Data
US 2020/0037293 A1 Jan. 30, 2020

Related U.S. Application Data

(60) Provisional application No. 62/476,193, filed on Mar. 24, 2017.

(51) Int. Cl.
*H04W 72/04* (2009.01)
*H04W 48/08* (2009.01)

(52) U.S. Cl.
CPC ......... *H04W 72/042* (2013.01); *H04W 48/08* (2013.01)

(58) Field of Classification Search
CPC ... H04W 40/24; H04W 48/08; H04W 72/042; H04W 76/00; H04W 8/005;
(Continued)

(56) References Cited

U.S. PATENT DOCUMENTS 10,396,959 B2 * 8/2019 John Wilson .......... H04L 5/0053
2019/0327710 A1 * 10/2019 Liu ....................... H04W 68/02
(Continued)

OTHER PUBLICATIONS

John Wilson et al., "Signaling Beamforming Relationships Between Control and Data Channels", Qualcomm, U.S. Appl. No. 62/420,036, pp. 1-41 (Year: 2018).*

(Continued)

*Primary Examiner* — Thomas R Cairns
(74) *Attorney, Agent, or Firm* — Baker Botts, LLP (57) ABSTRACT

According to some embodiments, a method for use in a network node comprises: determining a quasi-colocation (QCL) status between a reference signal (e.g., initial access signal such as system synchronization block (SSB), or a tracking reference signal (TRS)) and a control signal (e.g., a paging signal, a random access response (RAR), or a channel such as physical downlink control channel (PDCCH) or physical downlink shared channel (PDSCH)); and signaling the QCL status to a wireless device. A method for use in a wireless device may comprise: receiving a QCL status between a reference signal and a control signal; receiving the reference signal; estimating one or more signal parameters based on the received reference signal; and when the reference signal and the control signal are QCL, receiving the control signal using the estimated signal parameters to optimize reception of the control signal.

5 Claims, 8 Drawing Sheets

(58) Field of Classification Search
CPC .......... H04W 48/10–14; H04W 72/14; H04W 74/0866; H04B 1/76; H04L 5/0023; H04L 5/0025; H04L 5/0048; H04L 5/005–0051; H04L 5/0053; H04L 5/0055–0057; H04L 5/0091; H04L 5/0092–0098; H04L 27/2611

See application file for complete search history.

(56) References Cited

U.S. PATENT DOCUMENTS

2019/0357159 A1* 11/2019 Pan .................. H04L 1/1861
2020/0099437 A1* 3/2020 Harada .............. H04W 76/19

OTHER PUBLICATIONS

Pan et al., "Broadcast Channel Transmission and Demodulation," IDAC Holdings, Inc., U.S. Appl. No. 62/454,621, pp. 1-53 (Year: 2019).*
3GPP TSG RAN WG1 Meeting #88; Athens, Greece; Source: NTT Docomo, Inc.; Title: Views on beam management framework (R1-1702798)—Feb. 13-17, 2017.
3GPP TSG RAN WG1 #88; Athens, Greece; Source: Samsung; Title: On DL QCL for NR (R1-1702961)—Feb. 13-17, 2017.
PCT International Search Report for International application No. PCT/IB2018/051980—dated Jun. 22, 2018.
PCT Written Opinion of the International Searching Authority for International application No. PCT/IB2018/051980—dated Jun. 22, 2018.

* cited by examiner

QUASI-COLOCATION OF SYSTEM ACCESS AND CONTROL SIGNALS

PRIORITY

This nonprovisional application is a US. National Stage Filing under 35 § 371 of international Patent Application Serial No. PCT/IB2018/051980 filed Mar. 23, 2018 and entitled "QUASI-COLOCATION OF SYSTEM ACCESS AND CONTROL SIGNALS" which claims priority to Provisional Patent Application No. 62/476,198 filed Mar. 24, 2017 both of which are hereby incorporated by reference in their entirety.

TECHNICAL FIELD

Particular embodiments are directed to wireless communications and, more particularly, to quasi-colocation of system access signals and additional control signals.

Introduction

In a Third Generation Partnership Project (3GPP) long term evolution (LTE) network, a device acquires network synchronization and system information (SI) to connect to the network. Synchronization is for adjusting the frequency of the device relative the network, and for finding the proper timing of the received signal from the network. In the New Radio (NR), the synchronization and access procedure may involve several signals.

The primary synchronization signal (PSS) facilitates network detection with a high frequency error, up to tens of ppm. Additionally, PSS provides a network timing reference. 3GPP has selected Zadoff-Chu sequences as PSS signals. The secondary synchronization signal (SSS) facilitates more accurate frequency adjustments and channel estimation while at the same time providing fundamental network information. A physical broadcast channel (PBCH) provides a subset of the minimum system information for random access. A system synchronization block (SSB) comprises the above signals. One possible structure is depicted in FIG. 1.

Figure 1:
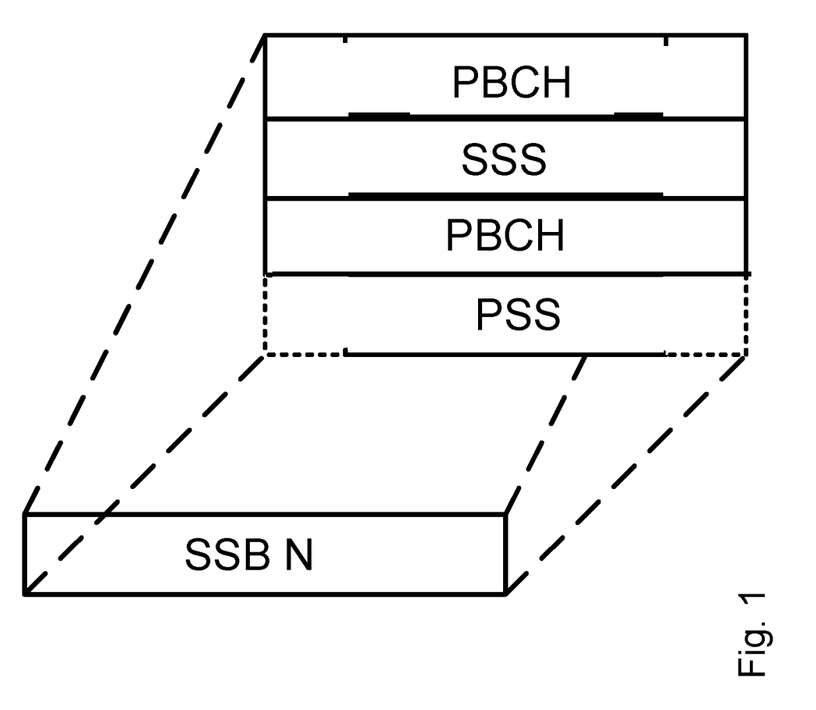
FIG. 1 illustrates an example system synchronization block (SSB) composition.

FIG. 1 illustrates an example system synchronization block (SSB) composition. The SSB includes the PSS, SSS, and PBCH described above. A SSB for a certain beam is transmitted periodically (e.g., every 20 ms). An example is illustrated in FIG. 2.

Figure 2:
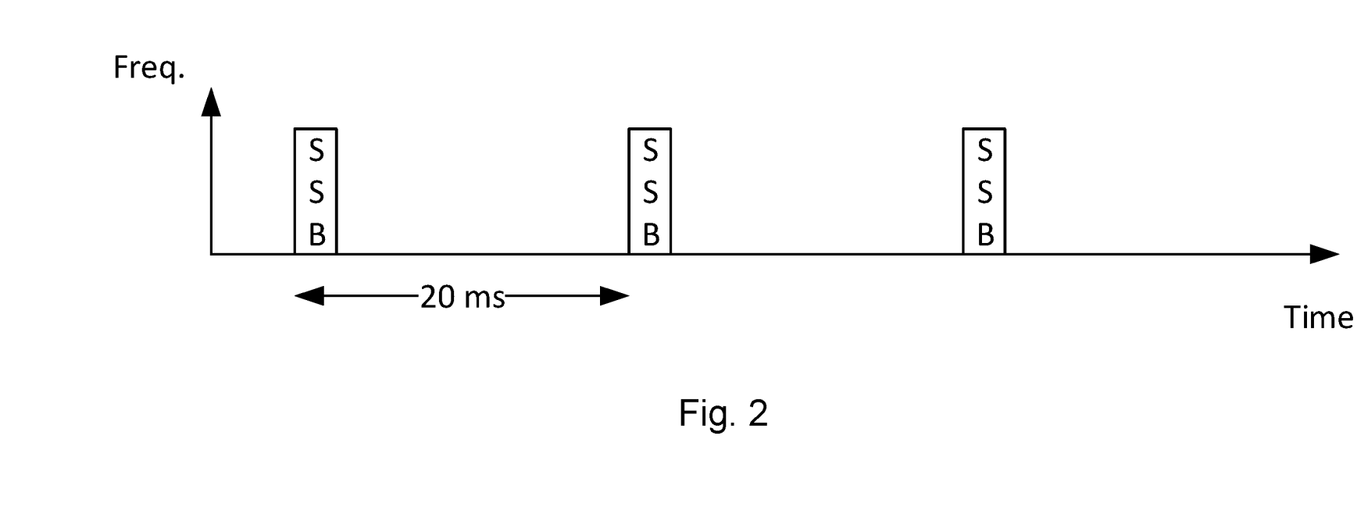
FIG. 2 illustrates the time-frequency distribution of an SSB.

FIG. 2 illustrates the time-frequency distribution of an SSB. The horizontal axis represents time and the vertical axis represents frequency. The SSB is transmitted every 20 ms in the example illustration.

Synchronization for NR will cover a larger bandwidth than LTE, most likely 4.32 MHz below 6 GHz carrier frequencies, and substantially higher than that above 6 GHz carrier frequencies.

A physical downlink shared channel (PDSCH) provides the remaining parts of the minimum system information (PDSCHSIB). PDSCHSIB may be transmitted in resources indicated by PBCH.

Paging informs a UE in an idle or inactive state about the need to connect to the network, or to signal updated SI or emergency messages. In LTE, paging is delivered like any downlink data using the physical downlink control channel (PDCCH) and the PDSCH. The paging message, transmitted on the PDSCH, is allocated transmission resources by a scheduling assignment on the PDCCH addressed to the paging radio network temporary identifier (P-RNTI) (which is shared by all user equipment (UEs)). The delivery channel is cell-specific, since both the reference signals (CRS) and the scrambling are derived from the physical cell identifier (PCI).

For NR, the paging message is scheduled by downlink control information (DCI) transmitted on an NR-PDCCH, and the paging message is then transmitted on the associated NR-PDSCH. The same principle as in LTE (i.e., delivering paging on a physical channel where the information needed to demodulate the physical channel can be derived from the camping cell PCI) should also be supported in NR.

The paging furthermore supports a variable payload, at least because the UE IDs used for paging may be of variable size and paging of multiple UEs during one paging occasion needs to be supported to allow long network discontinuous transmission (DTX). The paging payload can be from 10-20 for paging a single UE up to several hundred information bits for emergency message transmission. Thus, the format needs to support at least such payload variations.

Because paging is typically performed over larger areas, single-frequency network (SFN) transmission involving multiple cells or multiple transmission points serving the same cell is possible, with the benefit of improving the link budget. Thus, NR paging may support SFN transmission and may support a common configuration for the transmission reception points (TRPs) that transmit paging. NR paging may support two options for configuration of the information needed for the UE to demodulate the paging channel (e.g., DMRS) and its scrambling phase: (1) based on camping cell PCI or (2) configurable by the gNB to support SFN transmission.

NR also includes random access signals. An example access procedure is illustrated in FIG. 3.

Figure 3:
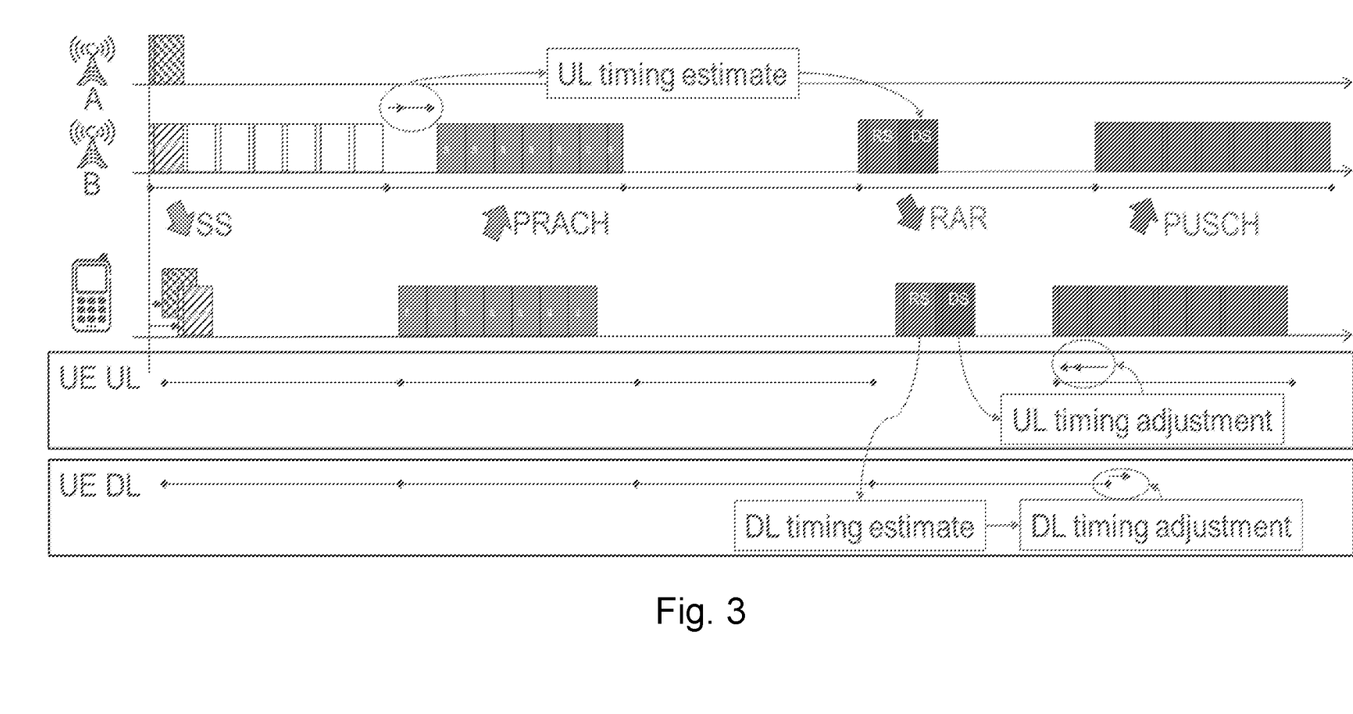
FIG. 3 illustrates an example uplink and downlink synchronization in an initial access procedure.

FIG. 3 illustrates an example uplink and downlink synchronization in an initial access procedure. The UE selects a downlink timing reference based on received SS block from gNB A and transmits a physical random access channel (PRACH) preamble based on this downlink timing. Both gNB A and gNB B might detect PRACH such that gNBs might then transmit RA response (RAR) or the nodes might be coordinated such that only one of them transmits RAR.

Particular signals may be referred to as quasi-colocated (QCL). The QCL relationship refers to a network transmission arrangement where two or more signals are transmitted in a way that the UE can assume similar second-order characteristics for the received signals: Doppler, delay spread, direction(s) of arrival, etc. The complex channel characterization (channel coefficients need not be the same). QCL has the potential to improve UE performance by facilitating second-order channel characterization on more signals, or reducing UE processing complexity and energy consumption (e.g., by avoiding repeating estimation procedures).

For the PCI-based paging channel configuration, QCL assumptions may in some deployments aid the UE to receive paging signals using channel characterization obtained from reception of the SSB. For example, the UE receiver may need to be turned on for a shorter time if it can determine the relevant paging beam from the SSB beam, and/or the receive beam configuration determined from SSB reception may be used without having to determine the weights anew.

Whether paging actually is QCL with SS Block transmission, however, depends on the given network deployment. For example, the SS Block could be transmitted using multiple beams (e.g., to support PRACH processing) while the paging message is sent via a wide PCI-based beam, in which case the QCL assumption would not apply. Paging could also be transmitted by nodes other than the BSS block.

In the RA process, depending on the deployment, the RAR might also be transmitted by the same or another node as the SS-block. A problem is that the UE can in some cases, but not others, assume QCL between SS-block and RAR. Therefore, the UE is not able to use general QCL assumptions for improved energy-efficiency or performance of other control signaling.

The alternatives described in the Introduction section are not necessarily alternatives that have been previously conceived or pursued. Therefore, unless otherwise indicated herein, the alternatives described in the Introduction section are not prior art and are not admitted to be prior art by inclusion in the Introduction section.

SUMMARY

The embodiments described herein signal the quasi-colocated (QCL) assumption of (at least parts of), for example, the system synchronization block (SSB) and another control signal to the UE as part of other control signaling reception configuration. The UE subsequently optimizes the control signal reception according to the received QCL assumption information.

In some embodiments, UE configuration by the network for paging in the PCI-based paging mode specifies whether paging signals are QCL with SSB transmission. The UE applies QCL assumptions, or not, based on the received configuration for paging reception after having detected the SSB.

In some embodiments, essential system information (e.g., in PBCH) includes an indication whether the random access response (RAR) is QCL with SSB. The UE then receives the RAR appropriately, using or ignoring QCL assumptions with SSB.

According to some embodiments, a method for use in a network node comprises: determining a quasi-colocation (QCL) status between a reference signal (e.g., initial access signal such as system synchronization block (SSB), or a tracking reference signal (TRS)) and a control signal (e.g., a paging signal, a random access response (RAR), or a channel such as physical downlink control channel (PDCCH) or physical downlink shared channel (PDSCH)); and signaling the QCL status to a wireless device.

In particular embodiments, the signaling comprises radio resource control (RRC) configuration or broadcast transmission. Signaling the CQL status to the wireless device may comprise signaling which attributes of the reference signal are CQL with the control signal.

According to some embodiments, a network node comprises processing circuitry. The processing circuitry is operable to determine a QCL status between a reference signal and a control signal, and signal the QCL status to a wireless device.

A method for use in a wireless device may comprise: receiving a QCL status between a reference signal (e.g., initial access signal such as SSB, or a TRS) and a control signal (e.g., a paging signal, a RAR, or a channel such as PDCCH or PDSCH); receiving the reference signal; estimating one or more signal parameters based on the received reference signal; and when the reference signal and the control signal are QCL, receiving the control signal using the estimated signal parameters to optimize reception of the control signal.

In particular embodiments, receiving the QCL status comprises receiving RRC configuration or a broadcast transmission. The processing circuitry may be operable to receive the CQL status by receiving an indication of which attributes of the reference signal are CQL with the control signal.

According to some embodiments, a wireless device comprises processing. The processing circuitry is operable to: receive a QCL status between a reference signal and a control signal; receive the reference signal; estimate one or more signal parameters based on the received reference signal; and when the QCL status indicates the reference signal and the control signal are quasi-colocated, receive the control signal using the estimated signal parameters to optimize reception of the control signal in terms of at least one of energy efficiency and performance.

According to some embodiments, a network node comprises a determining module and a signaling module. The determining module is operable to determine a QCL status between a reference signal and a control signal. The signaling module is operable to signal the QCL status to a wireless device.

According to some embodiments, a wireless device comprises a receiving module and an estimating module. The receiving module is operable to: receive a QCL status between a reference signal and a control signal; and receive the reference signal. The estimating module is operable to estimate one or more signal parameters based on the received reference signal. When the QCL status indicates the reference signal and the control signal are quasi-colocated, the wireless device receives the control signal using the estimated signal parameters to optimize reception of the control signal in terms of at least one of energy efficiency and performance.

Also disclosed is a computer program product. The computer program product comprises instructions stored on non-transient computer-readable media which, when executed by a processor, perform the steps of: determining a QCL status between a reference signal and a control signal; and signaling the QCL status to a wireless device.

Another computer program product comprises instructions stored on non-transient computer-readable media which, when executed by a processor, perform the steps of: receiving a QCL status between a reference signal and a control signal; receiving the reference signal; estimating one or more signal parameters based on the received reference signal; and when the reference signal and the control signal are QCL, receiving the control signal using the estimated signal parameters to optimize reception of the control signal.

Particular embodiments may exhibit some of the following technical advantages. Particular embodiments may maximize UE energy efficiency and/or reception or detection performance of critical system signaling in a range of deployments. The QCL property may be used when it is valid, instead of always ignoring it because it may not be valid for some cases. Other technical advantages will be readily apparent to one skilled in the art from the following figures, description and example claims.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

In a Third Generation Partnership Project (3GPP) long term evolution (LTE) network, a device acquires network synchronization and system information (SI) to connect to the network. Synchronization is for adjusting the frequency of the device relative the network, and for finding the proper timing of the received signal from the network. In the New Radio (NR), the synchronization and access procedure may involve several signals (i.e., primary synchronization signal (PSS), secondary synchronization signal (SSS), broadcast channel (PBCH), system synchronization block (SSB), etc.).

Paging informs a user equipment (UE) in idle or inactive state about the need to connect to the network, or to signal updated SI or emergency messages. In LTE, paging is delivered like any downlink data using the physical downlink control channel (PDCCH) and the physical downlink shared channel (PDSCH). The paging message, transmitted on the PDSCH, is allocated transmission resources by a scheduling assignment on the PDCCH addressed to the paging radio network temporary identifier (P-RNTI) (which is shared by all UEs). The delivery channel is cell-specific, because both the reference signals (CRS) and the scrambling are derived from the physical cell identifier (PCI).

For NR, the paging message is scheduled by downlink control information (DCI) transmitted on an NR-PDCCH, and the paging message is then transmitted on the associated NR-PDSCH. The same principle as in LTE (i.e., delivering paging on a physical channel where the information needed to demodulate the physical channel can be derived from the camping cell PCI) may also be supported in NR.

NR also includes random access signals. The UE selects a downlink timing reference based on received SS block from a gNB and transmits a physical random access channel (PRACH) preamble based on this downlink timing.

Particular signals may be quasi-colocated (QCL). QCL has the potential to improve UE performance by facilitating second-order channel characterization on more signals, or reducing UE processing complexity and energy consumption (e.g., by avoiding repeating estimation procedures).

For the PCI-based paging channel configuration, QCL assumptions may, in some deployments, assist the UE in receiving paging signals using channel characterization obtained from the received SSB. For example, a UE may turn on its receiver for a shorter time if the UE can determine the relevant paging beam from the SSB beam, and/or the receive beam configuration determined from SSB reception may be used without having to determine the weights anew.

Whether paging actually is QCL with SS Block transmission, however, depends on the given network deployment. For example, the SS Block could be transmitted using multiple beams (e.g., to support PRACH processing) while the paging message is sent via a wide PCI-based beam, in which case the QCL assumption would not apply. Paging could also be transmitted by nodes other than the BSS block.

In the RA process, depending on the deployment, the RAR might also be transmitted by the same or another node as the SS-block. A problem is that the UE can in some cases, but not others, assume any QCL between SS-block and RAR. Therefore, the UE is not able to use general QCL assumptions for improved energy-efficiency or performance of other control signaling.

Particular embodiments obviate the problems described above and include signaling the quasi-colocated (QCL) assumption of (at least parts of) the SSB (or other reference signal) and another control signal to the UE as part of other control signaling reception configuration. The UE subsequently optimizes the control signal reception according to the received QCL assumption information.

In some embodiments, UE configuration by the network for paging in the PCI-based paging mode specifies whether paging signals are QCL with SSB transmission. The UE applies QCL assumptions, or not, based on the received configuration for paging reception after having detected the SSB.

In some embodiments, essential system information (e.g., in PBCH) includes an indication whether the random access response (RAR) is QCL with SSB. The UE then receives the RAR appropriately, using or ignoring QCL assumptions with SSB.

Particular embodiments may maximize UE energy efficiency and/or reception or detection performance of critical system signaling in a range of deployments. The QCL property may be used when it is valid, instead of always ignoring it because it may not be valid for some cases.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 4-8B of the drawings, like numerals being used for like and corresponding parts of the various drawings. LTE and NR are used throughout this disclosure as an example cellular system, but the ideas presented herein may apply to other wireless communication systems as well.

Figure 4:
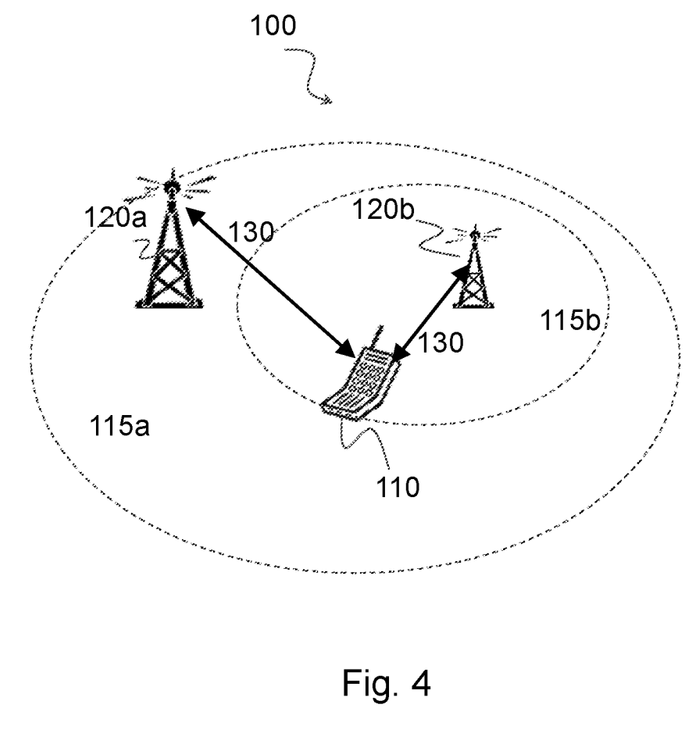
FIG. 4 is a block diagram illustrating an example wireless network, according to some embodiments.

FIG. 4 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Wireless device 110 may also be referred to as a UE. Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Communication between wireless device 110 and network node 120 may be referred to as cellular communication.

Wireless signals 130 may include both downlink transmissions (from network node 120 to wireless devices 110) and uplink transmissions (from wireless devices 110 to network node 120). Wireless signals 130 may include reference signals and control signals. For example, wireless signals 130 may include an initial access signal such as SSB that includes PSS, SSS, etc. Other reference signals may include a tracking reference signal (TRS). Wireless signal 130 may include control signals, such a paging signals or random access response signals. The control signals may include control channels such as PDSCH and PDCCH. Particular signals may be quasi-colocated with other signals. For example, some control signals may be quasi-colocated with a reference signal.

Each network node 120 may have a single transmitter 140 or multiple transmitters 140 for transmitting signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120 or other wireless devices 110.

Network node 120a may determine a quasi-colocation (QCL) status between a reference signal, such as an initial access signal, and a control signal. Network node 120a may signal the QCL status to wireless device 110. In particular embodiments, the reference signal comprises an initial access signal such as a new radio (NR) system synchronization block (SSB). In other embodiments, the reference signal may comprise a TRS. In particular embodiments, the control signal is a paging signal and the signaling comprises radio resource control (RRC) configuration, or the control signal is a random access response (RAR) and the signaling comprises broadcast transmission.

Wireless device 110 may receive a quasi-colocation (QCL) status between a reference signal, such as an initial access signal, and a control signal. Wireless device 110 may receive the reference signal and estimate one or more signal parameters based on the received reference signal. When the QCL status indicates the reference signal and the control signal are quasi-colocated, wireless device 110 receives the control signal using the estimated signal parameters to optimize reception of the control signal in terms of at least one of energy efficiency and performance. When the QCL status indicates the initial access signal and the control signal are not quasi-colocated, wireless device 110 receives the control signal without using the estimated signal parameters. In other embodiments, if control signal is not QCL with the initial access signal, the control signal may be QCL with a different reference signal, such as a TRS. In some embodiments, wireless device 110 may receive the control signal based on QCL parameters of the TRS. Particular algorithms for signaling QCL assumptions are described in more detail with respect to the examples given below and FIGS. 5 and 6.

In wireless network 100, each network node 120 may use any suitable radio access technology, such as long term evolution (LTE), LTE-Advanced, NR, UMTS, HSPA, GSM, cdma2000, NR, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 7A below. Similarly, a network node may include any suitable combination of hardware and/or software. For example, in particular embodiments, a network node, such as network node 120, may include the components described with respect to FIG. 8A below.

Particular embodiments may apply to paging, as one example. In a paging embodiment, the UE may be configured with SSB-paging PDCCH/PDSCH QCL status in a dedicated manner. The RRC configuration for paging includes information about whether the SSB and the paging signals are QCL.

The QCL status is known to the network based on the current deployment configuration. Some examples where QCL does not hold include cases when the SSB is transmitted using multiple beams (e.g., to support PRACH processing), while the paging message is sent via a wide PCI-based beam, or when paging could also be transmitted by nodes other than those transmitting the SSB.

If the UE is informed that the QCL assumption holds, the UE may use the QCL information in several ways. For example, the UE may turn on its receiver for paging reception for only a short time if it can determine the relevant paging beam arrival timing from the SSB beam arrival timing, or the UE may omit receive beam scanning in case of analog beamforming at the UE. Also, the receive beam configuration that was determined from SSB reception may be used without having to determine the weights anew. Otherwise, the UE may use a full paging reception window, a full scan, and/or re-compute the reception weights.

Particular embodiments may apply to RAR, as another example. In a RAR embodiment, the UE obtains SSRAR QCL information from the PBCH reception, or from any other broadcast signal received by the UE before starting the random access procedure. A bit in the PBCH thus indicates whether the RAR can be assumed to be QCL with the SSB.

The QCL status is again known to the network based on the current deployment configuration. Some examples where QCL does not hold include cases when the SSB might be transmitted by a different node as compared to RAR, or when the SSB is transmitted as SFN.

If the UE is informed that the QCL assumption holds, the UE may limit receive beamforming to the same direction where the SSB was received, and omit receive beam scanning in case of analog beamforming at the UE. Also, the receive beam configuration that was determined from SSB reception may be used without having to determine the weights anew. Otherwise, the UE may perform a full scan and/or re-compute the reception weights.

Although particular examples are described with respect to paging and random access, other embodiments may use the QCL status between any suitable reference signals and control signals. For example, some embodiments may determine whether a control signal, such as a PDCCH or PDSCH, is QCL with a TRS, or any other suitable combination.

Particular embodiments may include methods in a network node and a wireless device. The examples and embodiments described above may be generally represented by the flowcharts in FIGS. 5 and 6.

Figure 5:
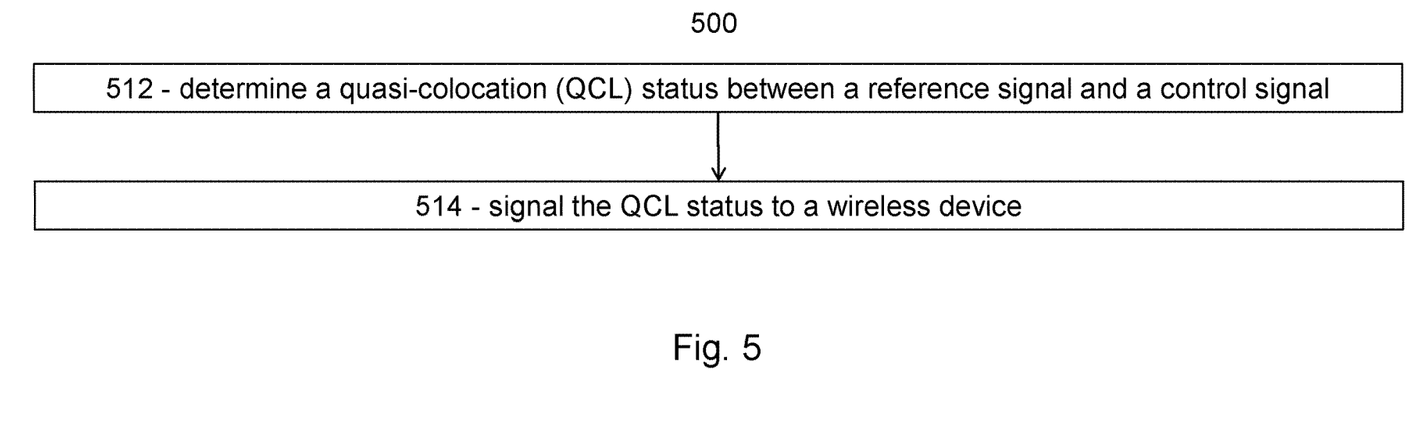
FIG. 5 is a flow diagram illustrating an example method for use in a network node, according to some embodiments.

FIG. 5 is a flow diagram illustrating an example method for use in a network node, according to some embodiments. In particular embodiments, one or more steps of FIG. 5 may be performed by components of wireless network 100 described with respect to FIG. 4.

The method begins at step 512, where the network node determines a QCL status between a reference signal and a control signal. For example, network node 120 may determine whether a SSB and a paging signal or a random access response signal are quasi-colocated. As another example, network node 120 may determine whether a TRS and a PDCCH are QCL.

The network may determine whether the relevant SSB signals and a control signal (e.g., a paging signal or a RAR) are QCL, according to predetermined QCL criteria. In some embodiments, the entire SSB or a subset of the SS signals (e.g., PSS/SSS) may be considered for QCL status determination.

At step 514, the network node signals the QCL status to a wireless device. For example, network node 120 may signal the QCL status to wireless device 110 using RRC signaling or a broadcast channel.

The network signals the QCL status to the UE (i.e., whether the control signal may be assumed to be QCL with the SSB). This may be done using, for example, broadcast signaling (PBCH in case of SS-RAR relationship) or dedicated signaling (RRC configuration for idle/inactive in case of SS-paging relationship).

In some embodiments, signaling the CQL status to the wireless device comprises signaling which attributes of the reference signal are CQL with the control signal. For example, in some embodiments a subset of the SS signals may be CQL with the control signal. As another example, particular attributes of a TRS may be considered CQL, while other attributes are not. For example, a subset of channel parameters such as arrival direction, Doppler, and dispersion may be QCL. The signaling includes an indication of which attributes or parameters are QCL.

Modifications, additions, or omissions may be made to method 500. Additionally, one or more steps in method 500 of FIG. 5 may be performed in parallel or in any suitable order. The steps of method 500 may be repeated over time as necessary.

Figure 6:
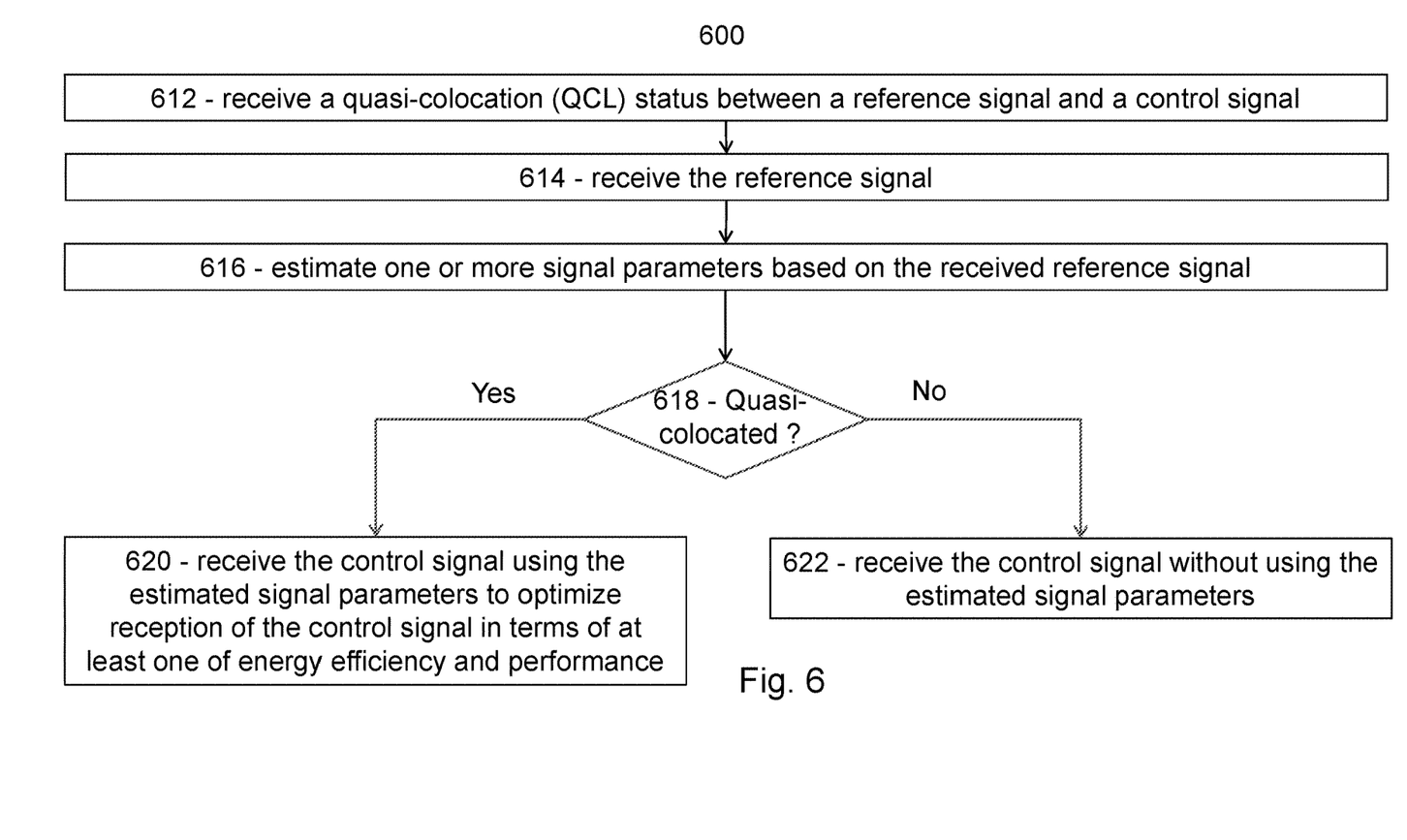
FIG. 6 is a flow diagram illustrating an example method for use in a wireless device, according to some embodiments.

FIG. 6 is a flow diagram illustrating an example method for use in a wireless device, according to some embodiments. In particular embodiments, one or more steps of FIG. 6 may be performed by components of wireless network 100 described with respect to FIG. 4.

The method begins at step 612, where the wireless device receives a quasi-colocation (QCL) status between a reference signal and a control signal. For example, wireless device 110 may receive a QCL status from network node 120. The wireless device receives the QCL status in preparation for detecting another control signal. The QCL status may indicate whether an SSB is quasi-colocated with a paging signal or a random access response. As another example, the QCL status may indicate whether a TRS is quasi-colocated with a PDCCH.

At step 614, the wireless device receives the reference signal. For example, wireless device 110 may receive a SSB, a TRS, or any other suitable reference signal.

At step 616, the wireless device estimates one or more signal parameters based on the received initial access signal. For example, wireless device 110 may estimate certain channel parameters (e.g., arrival direction, Doppler, and dispersion) of the received SSB.

At step 618, the wireless device determines whether the reference signal and the control signal are quasi-colocated based on the received QCL status. If the two signals are quasi-colocated, the method continues to step 620 where the wireless device receives the control signal using the estimated signal parameters to optimize reception of the control signal in terms of at least one of energy efficiency and performance. If the two signals are not quasi-colocated, the method continues to step 622 where the wireless device receives the control signal without using the estimated signal parameters.

For example, if the QCL status indicates that the control signal is QCL with the SSB, then wireless device 110 may use channel parameters estimated from SSB to facilitate reception of the control signal (e.g., using known beam direction info, arrival time info, etc.). If the QCL status indicates no QCL, then the parameters estimated from SSB are not used to facilitate ACS reception. Wireless device 110 may use a full paging reception window, a full scan, and/or re-compute the reception weights.

In some embodiments, when the QCL status indicates the reference signal and the control signal are not quasi-colocated, the wireless device may receive the control signal using estimated signal parameters of a different reference signal. For example, if the random access response control signal is not QCL with the SSB, the wireless device may assume the random access response, or the channel used to receive the random access response, is QCL with a different reference signal, such as a TRS.

Modifications, additions, or omissions may be made to method 600. Additionally, one or more steps in method 600 of FIG. 6 may be performed in parallel or in any suitable order. The steps of method 600 may be repeated over time as necessary.

Figure 7A:
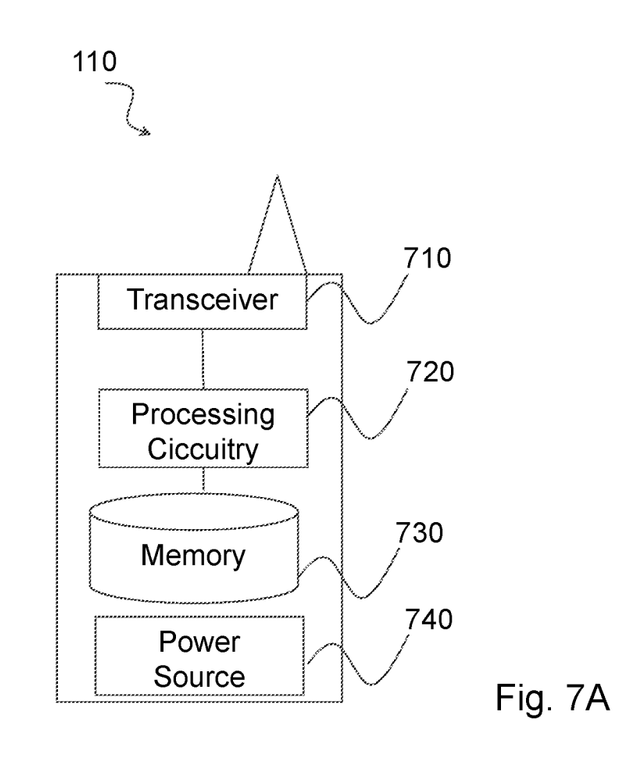
FIG. 7A is a block diagram illustrating an example embodiment of a wireless device.

FIG. 7A is a block diagram illustrating an example embodiment of a wireless device. The wireless device is an example of the wireless devices 110 illustrated in FIG. 4. In particular embodiments, the wireless device is capable of receiving a quasi-colocation (QCL) status between a reference signal and a control signal; receiving the reference signal; estimating one or more signal parameters based on the received reference signal; and when the QCL status indicates the reference signal and the control signal are quasi-colocated, receiving the control signal using the estimated signal parameters to optimize reception of the control signal in terms of at least one of energy efficiency and performance.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 710, processing circuitry 720, memory 730, and power source 740. In some embodiments, transceiver 710 facilitates transmitting wireless signals to and receiving wireless signals from wireless network node 120 (e.g., via an antenna), processing circuitry 720 executes instructions to provide some or all of the functionality described herein as provided by the wireless device, and memory 730 stores the instructions executed by processing circuitry 720. Power source 740 supplies electrical power to one or more of the components of wireless device 110, such as transceiver 710, processing circuitry 720, and/or memory 730.

Processing circuitry 720 includes any suitable combination of hardware and software implemented in one or more integrated circuits or modules to execute instructions and manipulate data to perform some or all of the described functions of the wireless device. In some embodiments, processing circuitry 720 may include, for example, one or more computers, one or more programmable logic devices, one or more central processing units (CPUs), one or more microprocessors, one or more applications, and/or other logic, and/or any suitable combination of the preceding. Processing circuitry 720 may include analog and/or digital circuitry configured to perform some or all of the described functions of wireless device 110. For example, processing circuitry 720 may include resistors, capacitors, inductors, transistors, diodes, and/or any other suitable circuit components.

Memory 730 is generally operable to store computer executable code and data. Examples of memory 730 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 740 is generally operable to supply electrical power to the components of wireless device 110. Power source 740 may include any suitable type of battery, such as lithium-ion, lithium-air, lithium polymer, nickel cadmium, nickel metal hydride, or any other suitable type of battery for supplying power to a wireless device.

In particular embodiments, processing circuitry 720 in communication with transceiver 710 receives a QCL status and uses parameters associated with a received reference signal to receive a control signal.

Other embodiments of the wireless device may include additional components (beyond those shown in FIG. 7A) responsible for providing certain aspects of the wireless device's functionality, including any of the functionality described above and/or any additional functionality (including any functionality necessary to support the solution described above).

Figure 7B:
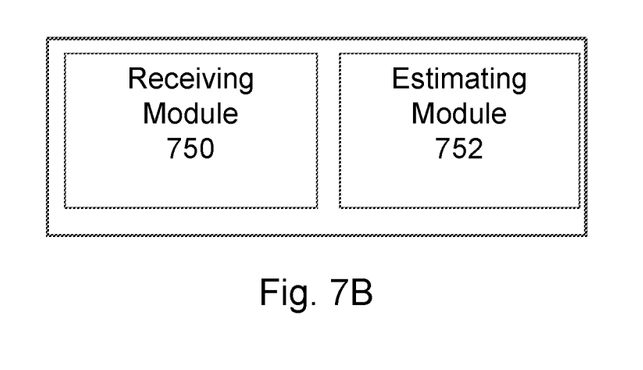
FIG. 7B is a block diagram illustrating example components of a wireless device.

FIG. 7B is a block diagram illustrating example components of a wireless device 110. The components may include receiving module 750 and estimating module 752.

Receiving module 750 may perform the receiving functions of wireless device 110. For example, receiving module 750 may receive QCL status, synchronization signals, and control signals according to any of the embodiments described above. In certain embodiments, receiving module 750 may include or be included in processing circuitry 720. In particular embodiments, receiving module 750 may communicate with estimating module 752.

Estimating module 752 may perform the estimating functions of wireless device 110. For example, estimating module 752 may estimate parameters associated with a reference signal according to any of the embodiments and examples described above. In certain embodiments, estimating module 752 may include or be included in processing circuitry 720. In particular embodiments, estimating module 752 may communicate with receiving module 750.

Figure 8A:
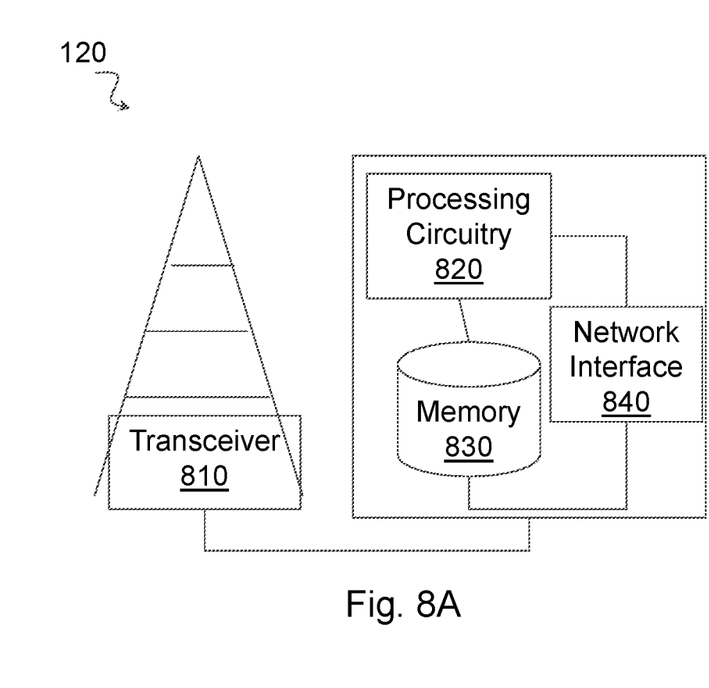
FIG. 8A is a block diagram illustrating an example embodiment of a network node.

FIG. 8A is a block diagram illustrating an example embodiment of a network node. The network node is an example of the network node 120 illustrated in FIG. 4. In particular embodiments, the network node may determine a quasi-colocation (QCL) status between an initial access signal and a control signal, and signal the QCL status to a wireless device.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. The network node includes at least one transceiver 810, processing circuitry 820, at least one memory 830, and at least one network interface 840. Transceiver 810 facilitates transmitting wireless signals to and receiving wireless signals from a wireless device, such as wireless devices 110 (e.g., via an antenna); processing circuitry 820 executes instructions to provide some or all of the functionality described above as being provided by a network node 120; memory 830 stores the instructions executed by processing circuitry 820; and network interface 840 communicates signals to backend network components, such as a gateway, switch, router, Internet, Public Switched Telephone Network (PSTN), controller, and/or other network nodes 120. Processing circuitry 820 and memory 830 can be of the same types as described with respect to processing circuitry 720 and memory 730 of FIG. 7A above.

In some embodiments, network interface 840 is communicatively coupled to processing circuitry 820 and refers to any suitable device operable to receive input for network node 120, send output from network node 120, perform suitable processing of the input or output or both, communicate to other devices, or any combination of the preceding. Network interface 840 includes appropriate hardware (e.g., port, modem, network interface card, etc.) and software, including protocol conversion and data processing capabilities, to communicate through a network.

In particular embodiments, processing circuitry 820 in communication with transceiver 810 determines a quasi-colocation (QCL) status between reference signal and a control signal, and signals the QCL status to a wireless device.

Other embodiments of network node 120 include additional components (beyond those shown in FIG. 8A) responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

Figure 8B:
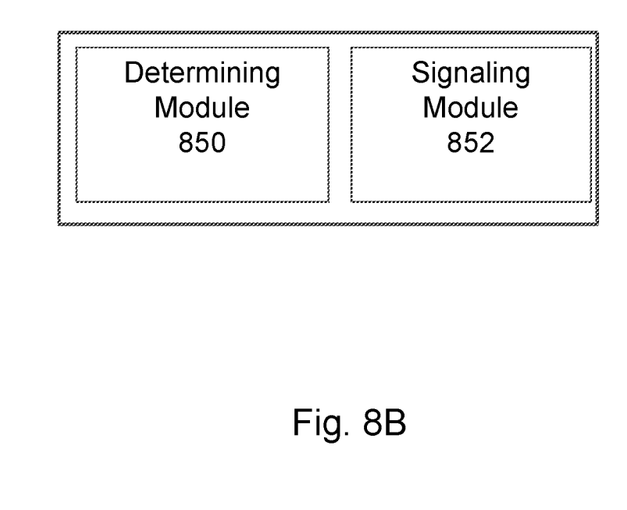
FIG. 8B is a block diagram illustrating example components of a network node.

FIG. 8B is a block diagram illustrating example components of a network node 120. The components may include determining module 850 and signaling module 852.

Determining module 850 may perform the determining functions of network node 120. For example, determining module 850 may determine whether a reference signal is quasi-colocated with a control signal according to any of the embodiments described above. In certain embodiments, determining module 850 may include or be included in processing circuitry 820. In particular embodiments, determining module 850 may communicate with signaling module 852.

Signaling module 852 may perform the signaling functions of network node 120. For example, signaling module 852 may signal a QCL status to a wireless device according to any of the embodiments and examples described above. In certain embodiments, signaling module 852 may include or be included in processing circuitry 820. In particular embodiments, signaling module 852 may communicate with determining module 850.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
BTS Base Transceiver Station
CSI Channel State Information
CSI-RS Channel State Information Reference Signal
D2D Device to Device
DCI Downlink Control Information
DL Downlink
DMRS Demodulation Reference Signal
DTX Discontinuous Transmission
eNB eNodeB
FDD Frequency Division Duplex
LTE Long Term Evolution
M2M Machine to Machine
MAC Medium Access Control
MIMO Multi-Input Multi-Output
MTC Machine Type Communication
NR New Radio
OFDM Orthogonal Frequency Division Multiplex
PBCH Physical Broadcast Channel
PCI Physical Cell Identifier
PDCCH Physical Downlink Control Channel
PDSCH Physical Downlink Shared Channel
PRACH Physical Random Access Channel
PRB Physical Resource Block
P-RNTI Paging Radio Network Temporary Identifier
PSS Primary Synchronization Signal
PUCCH Physical Uplink Control Channel
PUSCH Physical Uplink Shared Channel
QCL Quasi-Colocated
RA Random Access
RAN Radio Access Network
RAR Random Access Response
RAT Radio Access Technology
RB Resource Block
RBS Radio Base Station
RE Resource Element
RI Rank Index
RNC Radio Network Controller
RRC Radio Resource Control
RRH Remote Radio Head
RRU Remote Radio Unit
RS Reference Signal
SFN Single-Frequency Network
SI System Information
SSB System Synchronization Block
SSS Secondary Synchronization Signal
TDD Time Division Duplex
TSS Tertiary Synchronization Signal
UE User Equipment
UL Uplink
UTRAN Universal Terrestrial Radio Access Network
WAN Wireless Access Network

The invention claimed is:

1. A method for use in a wireless device, the method comprising:
   receiving a quasi-colocation (QCL) status between a reference signal and a control signal;
   receiving the reference signal;
   estimating one or more signal parameters based on the received reference signal;
   when the QCL status indicates the reference signal and the control signal are quasi-colocated, receiving the control signal using the estimated signal parameters to optimize reception of the control signal in terms of at least one of energy efficiency and performance;
   when the QCL status indicates the reference signal and the control signal are not quasi-colocated, receiving the control signal using estimated signal parameters of a different reference signal; and
   wherein the reference signal comprises a synchronization signal block (SSB) and the different reference signal comprises a tracking reference signal (TRS).

2. A wireless device comprising processing circuitry, the processing circuitry operable to:
   receive a quasi-colocation (QCL) status between a reference signal and a control signal;
   receive the reference signal;
   estimate one or more signal parameters based on the received reference signal;
   when the QCL status indicates the reference signal and the control signal are quasi-colocated, receive the control signal using the estimated signal parameters to optimize reception of the control signal in terms of at least one of energy efficiency and performance;
   when the QCL status indicates the reference signal and the control signal are not quasi-colocated, receive the control signal using estimated signal parameters of a different reference signal; and wherein the reference signal comprises a synchronization signal block (SSB) and the different reference signal comprises a tracking reference signal (TRS).

3. The wireless device of claim 2, wherein receiving the QCL status comprises receiving radio resource control (RRC) configuration.

4. The wireless device of claim 2, wherein receiving the QCL status comprises receiving broadcast transmission.

5. The method of claim 2, wherein the processing circuitry is operable to receive the QCL status by receiving an indication of which attributes of the reference signal are QCL with the control signal.

\* \* \* \* \*

UNITED STATES PATENT AND TRADEMARK OFFICE
CERTIFICATE OF CORRECTION

| | |
|---|---|
| PATENT NO. | : 11,089,584 B2 |
| APPLICATION NO. | : 16/496696 |
| DATED | : August 10, 2021 |
| INVENTOR(S) | : Andres Reial et al. |

Page 1 of 1

It is certified that error appears in the above-identified patent and that said Letters Patent is hereby corrected as shown below:

On the Title Page

Under item (60), under "Related U.S. Application Data", after "Provisional application No." please delete "62/476,193" and insert -- 62/476,198 --, therefor.

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*